Dec. 27, 1960
I. O. HOWICH
2,966,075
DIFFERENTIAL DRIVE MECHANISM
Filed Aug. 12, 1958
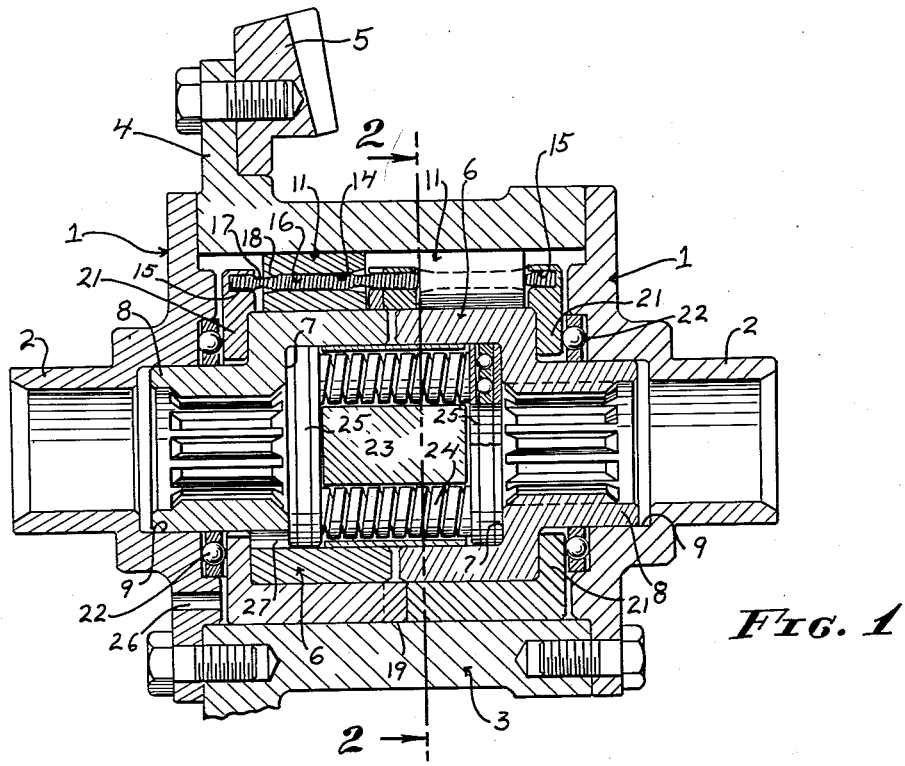
FIG. 1
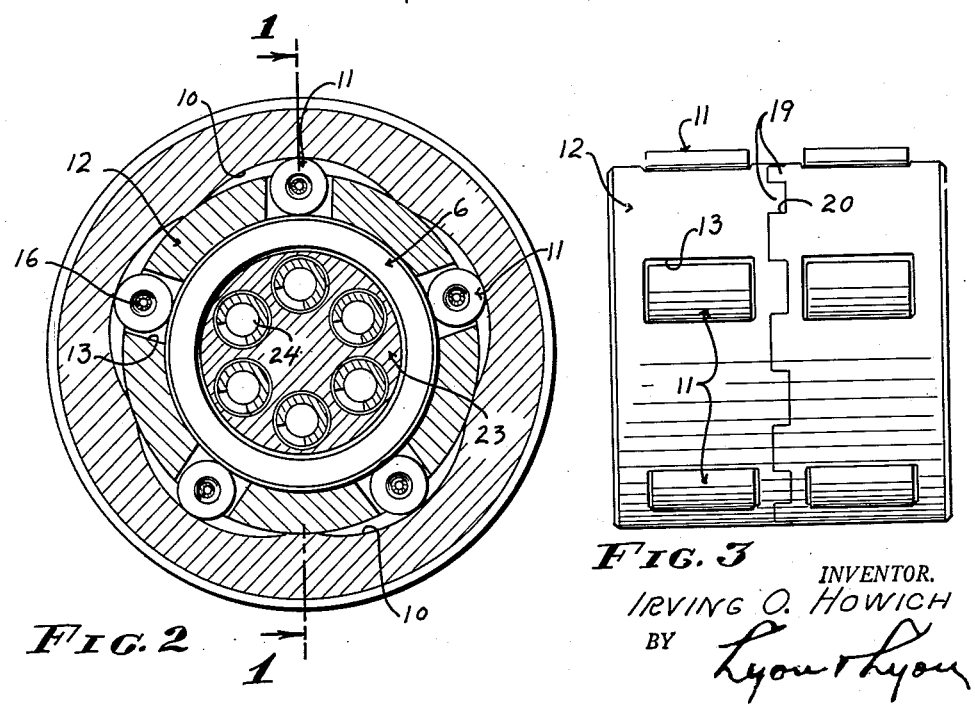
FIG. 2
FIG. 3
INVENTOR.
IRVING O. HOWICH
BY
Lyon & Lyon
ATTORNEYS

United States Patent Office 2,966,075
Patented Dec. 27, 1960

2,966,075

DIFFERENTIAL DRIVE MECHANISM

Irving O. Howich, Los Angeles, Calif. (% Universal Die Casting Co., 5001 Santa Fe Ave., Vernon 11, Calif.)

Filed Aug. 12, 1958, Ser. No. 754,686

3 Claims. (Cl. 74—650)

This invention relates to differential drive mechanisms, and included in the objects of this invention are:

First, to provide a differential drive mechanism which utilizes novelly arranged overriding clutch means in place of the conventional differential gearing.

Second, to provide a differential drive mechanism which is particularly suited to use in motor vehicles to drive the rear wheels thereof, the drive mechanism being so arranged that under normal straight driving, driving force is transmitted equally to both rear wheels, and when turning the vehicle a positive drive connection is maintained to the radially inside drive wheel, however should the inside drive wheel lose traction or slip a positive drive connection to the radially outside drive wheel is maintained.

Third, to provide a differential drive mechanism which is readily assembled and disassembled.

Fourth, to provide on the whole a novelly constructed, rugged, and compact differential drive.

With the above and other objects in view, as may appear hereinafter, reference is directed to the accompanying drawings in which:

Figure 1 is a longitudinal, sectional view of the differential drive mechanism taken through 1—1 of Figure 2;

Figure 2 is a transverse, sectional view thereof taken through 2—2 of Figure 1;

Figure 3 is an elevational view of the cage members.

The differential drive mechanism as illustrated is intended for installation in the differential housing of a motor vehicle in place of the conventional gear type differential.

The differential drive mechanism includes a pair of end plates 1 having outwardly extending central sleeves 2. The end plates are connected together by a cylindrical outer race shell 3 having a radially directed flange 4 to which is secured the conventional beveled drive gear 5 of a motor vehicle, adapted to be driven by a conventional pinion gear, not shown, mounted on the propeller shaft of the motor vehicle.

Within the enclosure formed by the end plates 1 and outer race shell 3 is a pair of cylindrical inner race members 6 which are disposed in coaxial relation. The remote ends of the inner race members have radially inwardly directed shoulders 7 which are joined to splined inner sleeves 8. The inner sleeves 8 extend into counterbores 9 formed in the central sleeves 2. The central sleeves 2 and inner sleeves 8 receive the ends of axles, not shown.

The outer race shell 3 is provided with a series of dual wedging recesses 10, that is, each wedging recess includes wedging surfaces converging in opposite directions relative to the surfaces of of the inner race members 6. Each wedging recess receives a drive roller 11 which, when opposite the center of the recess, occupies a free position, but when displaced in either direction from the center, each drive roller is caused to wedge between the inner and outer races so as to lock the races together.

Each inner race member is provided with a set of drive rollers. Each set of drive rollers is held in place by a roller cage 12 having slots 13 which loosely receive the drive rollers. The drive rollers 11 are provided with small, axially extending bores 14 and the roller cages 12 are provided with mating bores 15 which receive retainer springs 16. The retainer springs 16 are in the form of coiled springs of tight convolutions and are reduced in diameter to form neck portions 17 in the regions between the axial ends of the rollers and their slots. Also the axial ends of the rollers 11 may be internally beveled, as indicated by 18.

The roller cages 12 are cylindrical, and their confronting ends are provided with axially overlapping tongues 19 and slots 20 so that after assembly the two roller cages are secured against relative circumferential displacement and thus move as a single unit.

The remote axial ends of the roller cages 12 are provided with internal flanges 21 which overlie the outer surfaces of the shoulders 7, that is, they occupy a position between these shoulders and the end plates 1. Thrust bearings 22 are interposed between the flanges 21 and the end plates 1.

The inner race members 6 have confronting internal recesses forming a cylindrical cavity in which is mounted a spring cage 23 having longitudinal bores in which are fitted longitudinally extending springs 24. The extremities of the springs bear against inner thrust bearings 25 positioned for engagement with the shoulders 7.

Ports 26 are provided in the end plates 1, other ports 27 are provided in the shoulders 7, and clearance is provided between the inner peripheries of the flanges 21 and the sleeves 8, so that the parts of the differential drive mechanism may be lubricated.

Operation of the differential drive mechanism is as follows:

When the vehicle equipped with the differential drive mechanism is driving in a straight course, power is transmitted from the gear 5 and outer race shell 3 through both sets of drive rollers 11 to the inner race members 6, and from these members to the axles and drive wheels of the vehicle. This condition obtains even with moderate deviation from a straight course due to the normal slippage of the tires on the road. In making a sharp turn, however, the drive connection is concentrated in the radially inner axle and wheel of the motor vehicle.

At any time should one of the driving wheels lose traction, no loss of power to the driving wheel occurs. Thus, should one driving wheel of the vehicle engage a slick area or an area of reduced traction, power is transmitted through the differential to the wheel having the better traction.

It will be observed that the springs 24 tend to spread the inner race members 6 so as to force the shoulders 7 tightly against the internal flanges 21. As a consequence, there is maintained at all times a braking force on both cage members, tending to move the drive rollers 11 into wedging engagement with the inner and outer races. Thus there is a minimum, and for all practical purposes no lost motion in the driving operation; consequently, the possibility that the driving rollers might occupy a neutral position is avoided.

It will be noted that the springs 16 tend to maintain the rollers 11 in central positions in the slots 13, but permit displacement so that all the rollers of each set may move into wedging engagement between the outer and inner race members.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A differential drive mechanism, comprising: a pair of confronting inner race members adapted to be joined to coaxial drive shafts; a housing structure enclosing said inner race members and including an outer race member having wedging surfaces in confronting relation to said inner race members; a set of clutch rollers interposed between said wedging surfaces and each of said inner race members to establish driving connections between said housing structure and each of said inner race members; a cage for each set of clutch rollers including means for interconnecting said cages to prevent relative circumferential displacement, each cage having a series of slots for loosely receiving said rollers; yieldable means tending to center said rollers in their respective slots; each of said cages including an end flange interposed between an end wall of the corresponding inner race members and housing structure; and spring means interposed between said inner race members tending to separate said inner race members axially and force said inner race members into axial frictional engagement with said cage end flanges; and means resisting axial separation of said cages.

2. A differential drive mechanism, comprising: a pair of hollow cylindrical inner race members having internal shoulders at their remote axial extremities and means for connection to coaxially disposed shafts; spring means within said race members tending to separate said end members axially; a pair of cage units fitted over said inner race members and each having an internal end flange overlying the shoulder of the corresponding race member; means resisting axial separation of said cage units whereby said spring means forces the shoulders of said inner race members into frictional engagement with the end flanges of said cage units; a housing structure including an outer race confronting said inner race members, the confronting surfaces of said inner and outer race members defining wedging faces; and roller clutch members retained in said cages for engagement with said wedging surfaces.

3. A differential drive mechanism, comprising: a pair of hollow cylindrical inner race members having internal shoulders at their remote axial extremities and means for connection to coaxially disposed shafts; spring means within said race members tending to separate said end members axially; a pair of cage units fitted over said inner race members, said cage units having tongue and slot means at their confronting axial ends for interengagement to secure said cage members against relative circumferential displacement, each cage member also having a series of clutch roller slots, axially directed spring bores intersecting said slots, and an internal end flange overlying the shoulder of a corresponding inner race member; means resisting axial separation of said cage units whereby said spring means forces the shoulders of said inner race members into frictional engagement with the end flanges of said cage units; a housing structure including an outer race confronting said inner race members, the confronting surfaces of said inner and outer race members defining wedging faces; sets of roller clutch members fitting said slots for engagement with said wedging surfaces and having bores therethrough; and retainer springs threaded through said bores of the roller clutch members and cage members.

References Cited in the file of this patent

UNITED STATES PATENTS

| | | |
|---|---|---|
| 1,175,300 | Ross | Mar. 14, 1916 |
| 1,626,156 | Ross | Apr. 26, 1927 |
| 1,902,449 | Hughes | Mar. 21, 1933 |
| 2,191,763 | La Casse | Feb. 27, 1940 |
| 2,865,228 | Weismann | Dec. 23, 1958 |